April 27, 1948. D. E. BATESOLE 2,440,650
SKATE WHEEL STRUCTURE
Filed May 29, 1946
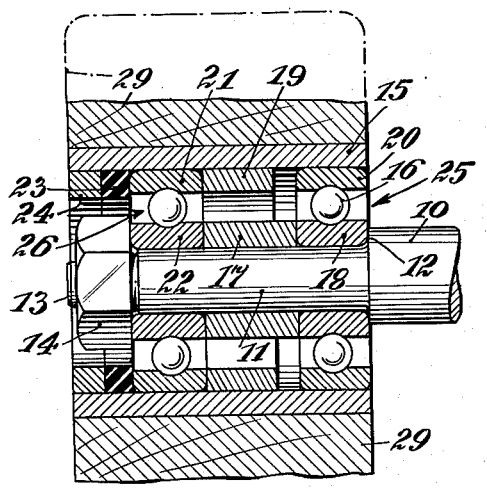
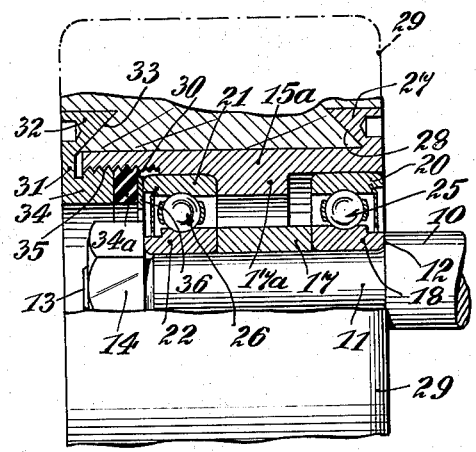
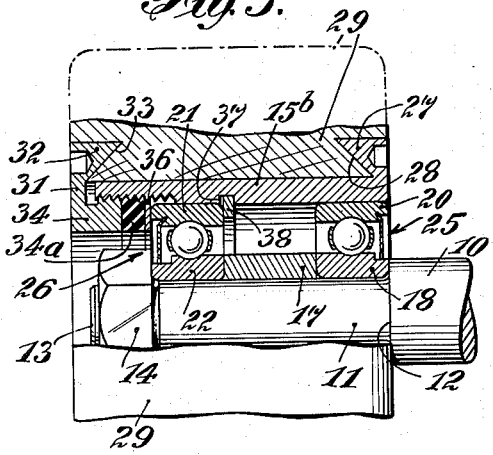
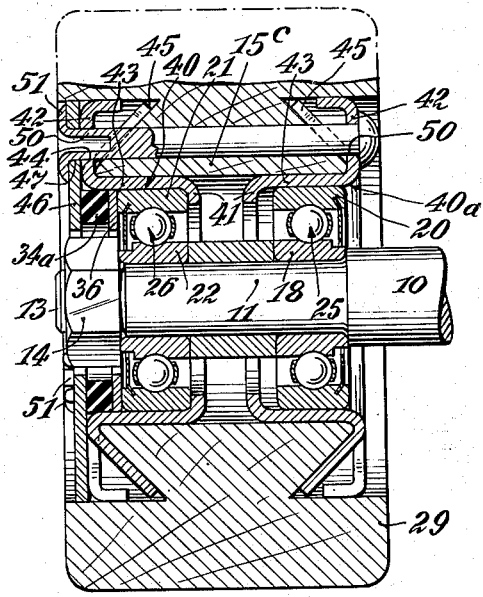
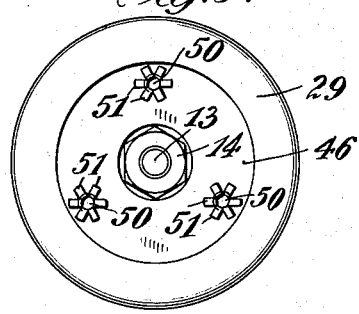
INVENTOR
*Dwight E. Batesole*
BY *C. P. Goepel*
his ATTORNEY Patented Apr. 27, 1948

2,440,650

UNITED STATES PATENT OFFICE 2,440,650

SKATE WHEEL STRUCTURE

Dwight E. Batesole, Glenbrook, Conn., assignor to Norma-Hoffmann Bearings Corporation, Stamford, Conn., a corporation of New York Application May 29, 1946, Serial No. 673,067

3 Claims. (Cl. 301—5.7)

This invention relates to skate wheel structures and has for its object to provide means for preventing squawks or similar noises during the use thereof when antifriction bearings are used in such a structure.

In such skate wheel structures wooden tires are used which roll or slide on wooden floors. Skaters in their forward movement frequently have the skates partake a curved path, or when stopping or turning, have the skates move transversely to the longitudinal axes of the skates. In consequence, a vibration is set up which causes a high pitched noise. When a pair of antifriction bearings are employed in such skate wheel structures, there is a thrust in one direction on one bearing and a thrust in another direction on the other bearing, hence this vibration is set up, and squawking results. And when a single bearing in such skate wheel structure is used, a swivelling action takes place of the balls side to side in the raceway of the bearing, which results in vibration and squawks. But after many attempts to overcome this defect of single bearing skate wheel structure, as for instance, by using a pair of bearings instead of one, and locking the outer rings laterally of both bearings by various means, all of which attempts were unsuccessful, and only after considerable research it was conceived that if only one bearing be locked at its outer ring and another bearing be used to stabilize the first bearing, and this second bearing be made to float, then the swivelling action and vibration became reduced to a harmless minimum, and the second bearing, instead of accentuating the squawking, actually was the cause of removing it. Thus, by having one of a pair of bearings within the confines of a skate wheel structure restrained or locked in position, and the other bearing of the pair free to move in either direction transversely to the longitudinal line of the skate, the objectionable swivelling and squawking was entirely avoided, by the compensatory actions preventing unnecessary vibrations.

The invention consists in the combination of a shaft, a tire surrounding the shaft and having a bore, a cylindrical member within the bore of the tire and concentric with the shaft, a pair of spaced antifriction bearings disposed on the shaft, means for preventing axial movement of the outer race ring of one of said antifriction bearings on said member, and means permitting axial movement of the outer race ring of the other antifriction bearing on said member, whereby the impeded antifriction bearing outer race ring takes up the radial and thrust loads, and the free-to-move antifriction bearing outer race ring takes up radial loads only, it being understood that said cylindrical member may be common to both outer race rings, or one of said members being provided for each of said outer race rings.

The invention will be more fully described hereinafter, embodiments thereof shown in the drawings, and the invention will be finally set forth in the claims.

In the accompanying drawings,

Fig. 1 is a diagrammatic view of the common cylindrical member within the tire, the shaft within the member and the pair of spaced antifriction bearings therebetween, one being free to move or floating;

Fig. 2 is a radial section of the embodiment of the invention to a roller skate wheel structure of known construction;

Fig. 3 is a radial section of a modified embodiment;

Fig. 4 is a radial section of another embodiment using a novel form of skate wheel structure, and Fig. 5 is a side view of Fig. 4.

Similar characters of reference indicate corresponding parts throughout the various views.

Referring to the drawings, there is shown diagrammatically in Fig. 1 the essential structures arranged in the novel combination of parts comprising the invention.

A shaft 10 has a subcaliber portion 11 terminating in a shoulder 12, and has a screwthreaded end 13 engaged by a screwthreaded nut 14. Concentric with the axis of the shaft 10 is a cylindrical member 15, the inner bore of which is spaced from the exterior of the shaft, a distance equal to the difference between the outer diameter and the inner diameter of a standard antifriction ball bearing. A ball bearing 16 having an inner diameter substantially equal to the diameter of the subcaliber portion 11, and an outer diameter substantially equal to the bore diameter of the member 15 is placed against the shoulder 12. A collar 17 is adjacent to the inner race ring 18 of the ball bearing 16. The inner diameter of this collar 17 is substantially equal to the diameter of the subcaliber portion 11 of the shaft and is held thereon against axial movement. Another collar 19 is inserted into the member 15, and held therein by a press fit, the outer diameter of the collar 19 and bore diameter of the member 15 being substantially equal. The end of the collar 19 nearest to the outer race ring 20 of the ball bearing is spaced from the same, this being important to prevent any resistance to axial movement of the outer race ring 20 in the sleeve 15, as this is intended to be a floating outer race ring. The other end of the collar 19 acts as an abutment to the outer race ring 21 of another ball bearing 26, when its inner race ring is slipped over the subcaliber portion of the shaft, the inner race ring 22 abutting against the collar 17. The nut 14 is then screwed home to press against the inner race ring 22, which in turn presses against the collar 17, the collar 17 pressing the inner race ring 18 against the shoulder 12. A rubber ring 23 is then placed against the outer race ring 21. In place thereof, a spring may be used. Then a metal ring 24 is pressed into the member 15 in tight clamping relationship, and all the parts are assembled.

This combination of parts operates in the following manner:

The inner ball bearing 16 having its outer racering 20 free to move axially takes up only radial loads, while the outer ball bearing 26 having its outer race ring 21 locked against axial movement takes up both radial and thrust loads. In consequence, any weight absorbing member attached to the outer peripheral portion of the member 15, as a tire, does not subject the combination to noises, like squawking and the like, since the outer race ring 20 is free to move axially being axially unrestrained.

The important feature is then the fact that only one ball bearing of a pair of ball bearings takes up all the thrust load, and the two bearings do not operate in opposition to each other. The use of a pair of ball bearings stabilizes one bearing by the presence of the other, but the floating bearing being free to move axially is not subjected to swivelling and the stabilization prevents the swivelling of the restrained bearing. The pair of bearings as described prevents the objectionable squawking.

The combination of parts described may be applied in different embodiments. In Figure 2, the member 15a and collar 17a are made integral, and the member 15a has also integral therewith, a V-shaped flange 27 to engage a circumferential recess 28 of the same configuration, the recess being in the tire 29. The other end of the member 15a is screwthreaded at its interior as at 30. A closing member 31 has a V-shaped flange 32 engaging a circumferential recess 33 of the tire, and another flange 34 having a screwthreaded portion 35 to engage the screwthreaded portion 30 of the member 15a. A rubber ring 34a is disposed at the inner face of the flange 34, and a metal plate 36 is placed adjacent to the ring 34a, and is pressed by the inherent resiliency of the rubber against the outer race ring 21 of the bearing 26. By unscrewing the closing member 31, the ring 34a and the plate 36 may be removed, and then the nut 14 is unscrewed, and the ball bearing 26 removed. The shaft 10 is then withdrawn and the collar 17 and ball bearing 25 are removed. The assembly is in reverse order while the ball bearing 26 is locked in position, the ball bearing 25 has its outer race ring free to move axially.

Instead of having the collar 17a integral with the member 15a as shown in Fig. 2, the member 15b is provided with a circumferential recess 37 into which a split ring 38 is inserted which acts as a stationary abutment for the outer race ring 21, as shown in Fig. 3. The skate wheel structure as described and as shown in Fig. 2, is known.

In another embodiment, Fig. 4, a novel assembly is secured to the tire by the following parts. The outer ball bearing 26 has its outer race ring 21 seated and held against axial movement in one direction by an S-shaped member 40, having an inturned flange 41 and an outturned flange 42, with an intermediate cylindrical portion 43, its inner diameter being substantially equal to the outer diameter of the race ring 21 and its outer diameter being substantially equal to the diameter of the bore of the tire 29. The outer flange 42 has two or more openings 44 and is bent inwardly to engage a V-shaped circumferential cutout 45 in the tire. A plate 46 having openings 47, extends towards the shaft 10, having a central opening for the passage of the shaft. Between the plate 46 and the bearing 26, the rubber ring 34a and the plate 36 are disposed as before described. A like S-shaped member 40a having a cylindrical portion 43 is provided, for seating the other bearing 25 so as to permit axial movement, the outer race ring 20 being spaced at all times from the flange 41. Thus, the floating bearing 25 takes up only radial loads, and the bearing 26, locked against axial movement, takes up radial as also thrust loads. Finally, the two S-shaped members 40 and 40a are forced against the tire by means of rivets 50 having hollow ends which are expanded and peened over as at 51 to obtain tight and endwise holding.

In each of the embodiments, the radial load bearing 25 is snug fitted into a cylindrical member, which holds its outer race ring in position, but does not sufficiently lock it to have the bearing take up thrust loads, while the outer race of the other ball bearing is locked to a cylindrical member. In Figs. 1 to 3, the cylindrical member is common to both outer race rings, while in Fig. 4 there is a cylindrical member for each outer race ring.

I have described several forms of my invention, but obviously various changes may be made in the details disclosed without departing from the spirit of the invention as set out in the following claims.

I claim:

1. In a skate wheel structure having a tire with a bore, the combination of a shaft, a cylindrical member surrounding the same having cylindrical inner bore portions, concentric with the shaft, a pair of spaced antifriction bearings having their inner race rings on the shaft, means for clamping the inner rings of both bearings to the shaft, means for locking the outer race ring of one of said antifriction bearings against axial movement in the cylindrical portions, the outer race ring of the other antifriction bearing being slidably disposed and free to move as a floating ring in the cylindrical portion and spaced from said outer race ring locking means, whereby the locked bearing takes up radial and axial loads, and the other bearing takes up radial loads only, and means securing the cylindrical member to the bore of the tire.

2. In a skate wheel structure having a tire with a bore, the combination of a shaft, a cylindrical member surrounding the same having cylindrical inner bore portions, concentric with the shaft, a pair of spaced antifriction bearings having their inner race rings on the shaft, means for clamping the inner rings of both bearings to the shaft including a spacer between the inner race rings of the bearings, means for locking the outer race ring of one of said antifriction bearings against axial movement in the cylindrical portions, including a collar on the cylindrical member engaging the outer race ring of the first bearing and spaced from the outer race ring of the second bearing and a collar engaging the other side of the outer race ring of the first bearing, the outer race ring of the other bearing being free to move as a floating ring, whereby the locked bearing takes up radial and axial loads, and the floating ring bearing takes up radial loads only, and means securing the cylindrical member to the bore of the tire.

3. In a skate wheel structure having a tire with a bore, and a circumferential recess at each side, the combination of a shaft, cylindrical inner bore portions concentric with the shaft, a pair of spaced antifriction bearings having their inner race rings on the shaft and their outer race rings on a cylindrical portion, means for clamping the inner rings of both bearings on the shaft including a spacer between the inner rings of the bearings, means for locking only the outer race ring of one of said antifriction bearings against axial movement, the outer race ring of the other bearing being free to move as a floating ring, whereby the locked bearing takes up radial and axial loads, and the floating bearing takes up radial loads only, and means securing the cylindrical portions to the tire, said means including an extension on each cylindrical portion having openings, said extension engaging the circumferential recess in the tire, and rivets with heads passing through the openings of the extensions and through holes in the tire, and said rivets having their other ends peened to lock the two extensions to the tire.

DWIGHT E. BATESOLE.

REFERENCES CITED

The following references are of record in the file of this patent:

UNITED STATES PATENTS

| Number | Name | Date |
|---|---|---|
| 2,188,251 | Nelson | Jan. 23, 1940 |
| 2,304,944 | Martinec | Dec. 15, 1942 |